United States Patent [19]

Russo et al.

[11] 4,432,583
[45] Feb. 21, 1984

[54] VEHICLE SEAT TRACK APPARATUS

[75] Inventors: Vincenzo Russo, Jackson; Max O. Heesch, Brooklyn, both of Mich.

[73] Assignee: International Telephone and Telegraph Corporation, New York, N.Y.

[21] Appl. No.: 250,065

[22] Filed: Apr. 1, 1981

[51] Int. Cl.³ ............................................... B60N 1/02
[52] U.S. Cl. ..................................... 297/330; 297/337; 248/394
[58] Field of Search ....................... 297/330, 337, 361; 248/394, 396

[56] References Cited

U.S. PATENT DOCUMENTS

| | | | |
|---|---|---|---|
| 2,783,826 | 3/1957 | Haltenberger | 297/361 |
| 2,915,111 | 12/1959 | Homier | 297/330 |
| 2,924,265 | 2/1960 | Himka | 297/330 |
| 2,942,647 | 6/1960 | Pickles | 297/330 X |
| 3,951,004 | 4/1976 | Heesch | 248/394 |
| 4,015,812 | 4/1977 | Heesch | 248/396 |

Primary Examiner—Francis K. Zugel
Attorney, Agent, or Firm—James B. Raden; Marvin M. Chaban

[57] ABSTRACT

A power seat track apparatus for selectively positioning an automotive vehicle seat. The apparatus is adapted to be powered by electric motor drive, preferably with separate motors for each drive direction. The seat back is mounted on the upper track of the seat track mechanism for horizontal drive with the track. The vertical drive through front and back torsion tubes or bars act on only the seat pan and seat cushion but not the seat back. Since the vehicle shock loading requirements must be met by the structural seat pan or seat frame, the pan for holding only the seat cushion may be reduced in size as compared to the usual power seat frame. The back cushion seat mounting is designed to withstand shock loading by its mounting on the upper seat track separate from the seat pan and cushion elevating mechanism.

7 Claims, 10 Drawing Figures

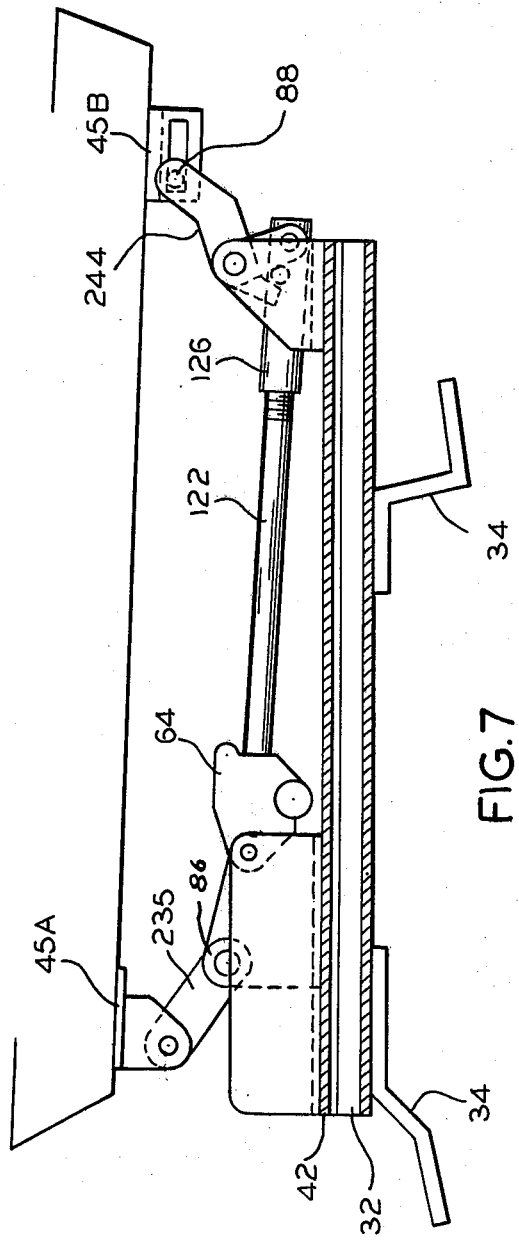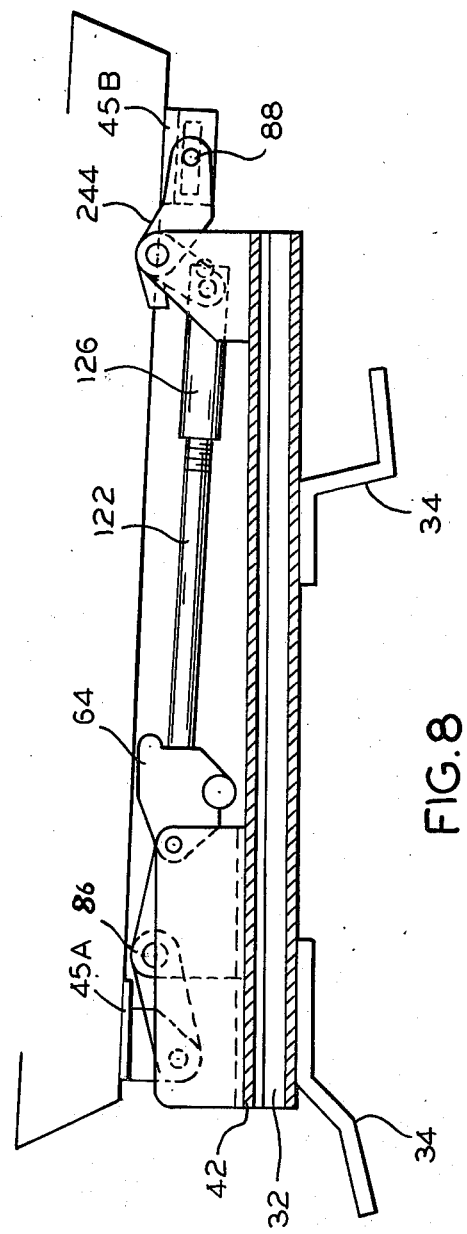

VEHICLE SEAT TRACK APPARATUS

BACKGROUND OF THE INVENTION

Apparatus for powered seat track adjustment or position setting of automotive seats are extremely well-known in the art. In most such track mechanisms, a unitary seat pan or seat cushion frame is mounted on the upper seat track for fore and aft movement under the control of a horizontal drive and for vertical movement of the forward and rear ends of the seat by operation of respective drives one for each seat end. The unitary seat pan includes the seat frame and seat cushion and back frame and back cushion. Thus, any movement of the seat frame and cushion causes like movement of both the back frame and back cushion, and any looseness in construction leads to a "chucking" condition prevalent in such mechanisms.

In U.S. Pat. No. 2,924,265 issued Feb. 9, 1960, the seat back is separated from the seat frame to prevent vertical movement of the seat back, while the seat frame and back are coupled together for horizontal motion. In this apparatus a single motor is used with solenoids actuatable to clutch the selected drive to the motor to drive the seat frame and seat back in a fore and aft direction and to drive the seat frame front and rear ends in a vertical direction. No additional seat back movement is disclosed by this reference.

SUMMARY OF THE INVENTION

The present invention provides a seat track mechanism of generally conventional type having parallel seat tracks establishing the lateral sides of the mechanism. The mechanism produces four types of seat motion: vertical movement of the front edge of the seat, vertical movement of the rear edge of the seat, horizontal translatory movement of the seat and seat back, and pivotal motion of the seat back. These movements are all generated by lead screw mechanisms individually driven by drives such as motor drives of any generally known conventional type.

Both vertical movements of the seat frame and cushion are produced by separate lead screws rotated by motor driven individual worm gears. Each lead screw travels within a threaded tubular member, the member being pivotally secured to one end of a link, the other end of the link being secured to a torsion bar rotated responsive to lead screw movement. A pivot arm on the torsion bar translates the rotary motion of the bar to move the seat support accordingly.

In accordance with the principles of the invention, a pivot connection is provided between a front link and the seat frame and a sliding pivot or lost motion connection is provided between a rear link and the rear portion of the seat frame such that when the front of the seat pan is raised, the seat pan front moves in an arc toward the rear. This movement results in the occupant of the seat having the lumbar region of his back pressed into the seat back and greatly enhances seating comfort.

Two lead screws driven by a single motor are used to produce the horizontal movement, the lead screws located parallel to the respective tracks. The lead screws are threaded within respective tubular openings of separate bracket members affixed to the upper tracks of the seat track structure. On operation of the horizontal drive motor, the seat track is advanced or retracted horizontally to carry the seat pan and seat back accordingly. A fourth motor is employed to pivot a seat back lead screw externally of the horizontal and vertical drives: the seat back drive lead screw rides within a threaded tube to advance and retract one end of a bell crank for pivoting the seat back alone.

It is therefore an object of the invention to provide an improved powerdriven, eight-way seat track apparatus in which the movements are generated by five lead screws using threaded drive engagements.

It is a further object of the invention to provide a powered seat track structure for a vehicle with powered, fore and aft horizontal movement being generated by lead screws, each such lead screw driving a threaded member affixed to a horizontal track at the lateral edges of the seat, and with powered vertical individual drive structure for both the front and rear ends of the seat.

It is a further object of the invention to provide a powered seat apparatus in which individual front and rear torsion bars are rotated to provide the output vertical movement of respective ends of the seat frame and cushion and in which the back seat frame and cushion are independent of the seat frame vertical movement, the back frame being independently pivotal about a horizontal lateral axis.

It is a still further object of the invention to provide an eight-way powered seat apparatus for a vehicle using similar power transferring members to produce horizontal movement of the seat frame and seat back frame, with individual, transversely-spaced power transferring members acting on respective torsion bars to elevate and lower the respective ends of the front and rear seat ends and using a similar drive to pivot the seat back independently of the seat frame movement.

Other objects, features and advantages of the invention will become apparent from the following specification viewed in conjunction with the drawings which are described briefly next.

BRIEF DESCRIPTION OF THE DRAWINGS

FIGS. 7 and 8 are sectional views taken along line 7—7 of FIG. 4 with FIG. 7 showing the full up position and FIG. 8 the full down position.

DETAILED DESCRIPTION OF THE DRAWINGS

Figure 1:
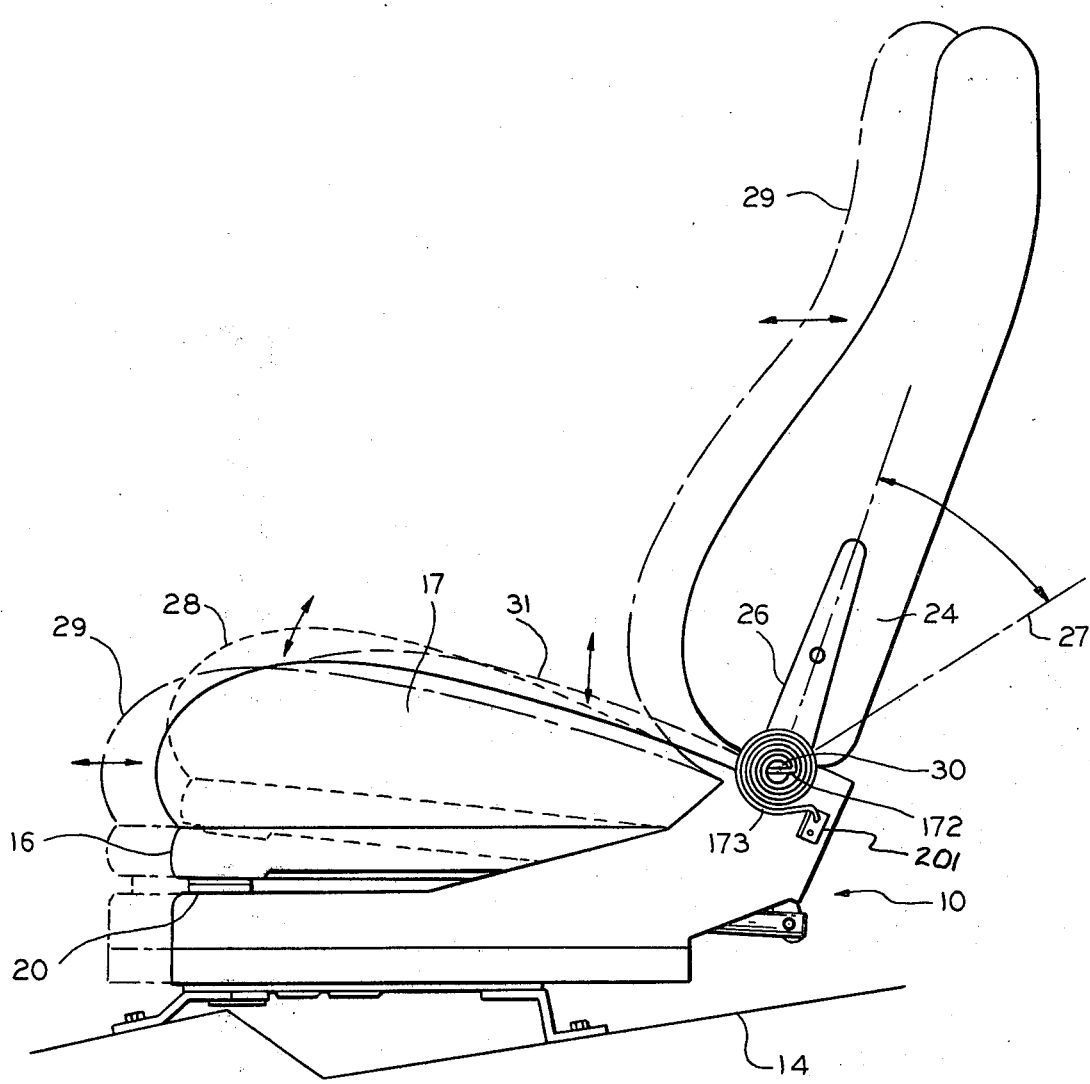
FIG. 1 is a side view in elevation of a seat mechanism using our invention.

FIG. 1 shows an adjustable seat mechanism 10 for a seat structure mounted with respect to the floor of an automobile as shown by solid line 14.

The seat structure preferably includes a rigid seat pan or seat frame 16 which may be of metal or molded plastic. The pan or seat frame 16 supports the seat cushion 17 and is secured to the respective upper seat track assembly 20 of a seat track mechanism of the type shown generally by U.S. Pat. No. 4,015,812 issued Apr. 15, 1977-Heesch. The pan or frame 16 and its mounting provides the structural strength and rigidity to enable the mechansim to withstand shock loading and meet the present test specifications.

The mounting engagement between the upper seat track 20 and the seat frame 16 allows selective vertical movement of the seat frame under the control of a conventional control button arrangement (not shown). The upper seat track 20 is also capable of fore and aft movement under selective control.

The seat back 24 is secured to the upper seat track assembly 20 for fore and aft movement with the seat track by means of a rigid bracket 26. The bracket 26 which controls pivotal movement of the seat back is pivoted by screw and nut drive of a seat back control about a pivot axis, as will be explained. This movement of the seat back from the full up position shown in FIG. 1 allows a maximum of 50° to 60° of arc travel between the full up position as shown and the full down position represented by line 27.

As shown in FIG. 1, the seat frame 16 is capable of fore and aft translatory movement from the rearward position shown by solid lines to the forward position shown by dashed line 29. The seat cushion borne by the frame is movable from the lowered condition shown by solid lines to a front end raised condition shown by dashed line 28, and/or a rear end raised condition shown by dashed line 31, (both dashed lines being shown with the seat frame in its retracted condition). The seat back frame is pivotal about the axis 30 of bracket 26 to the position shown by dashed line 27, the seat back 24 also being movable in a fore and aft sense with the seat frame.

Figure 2:
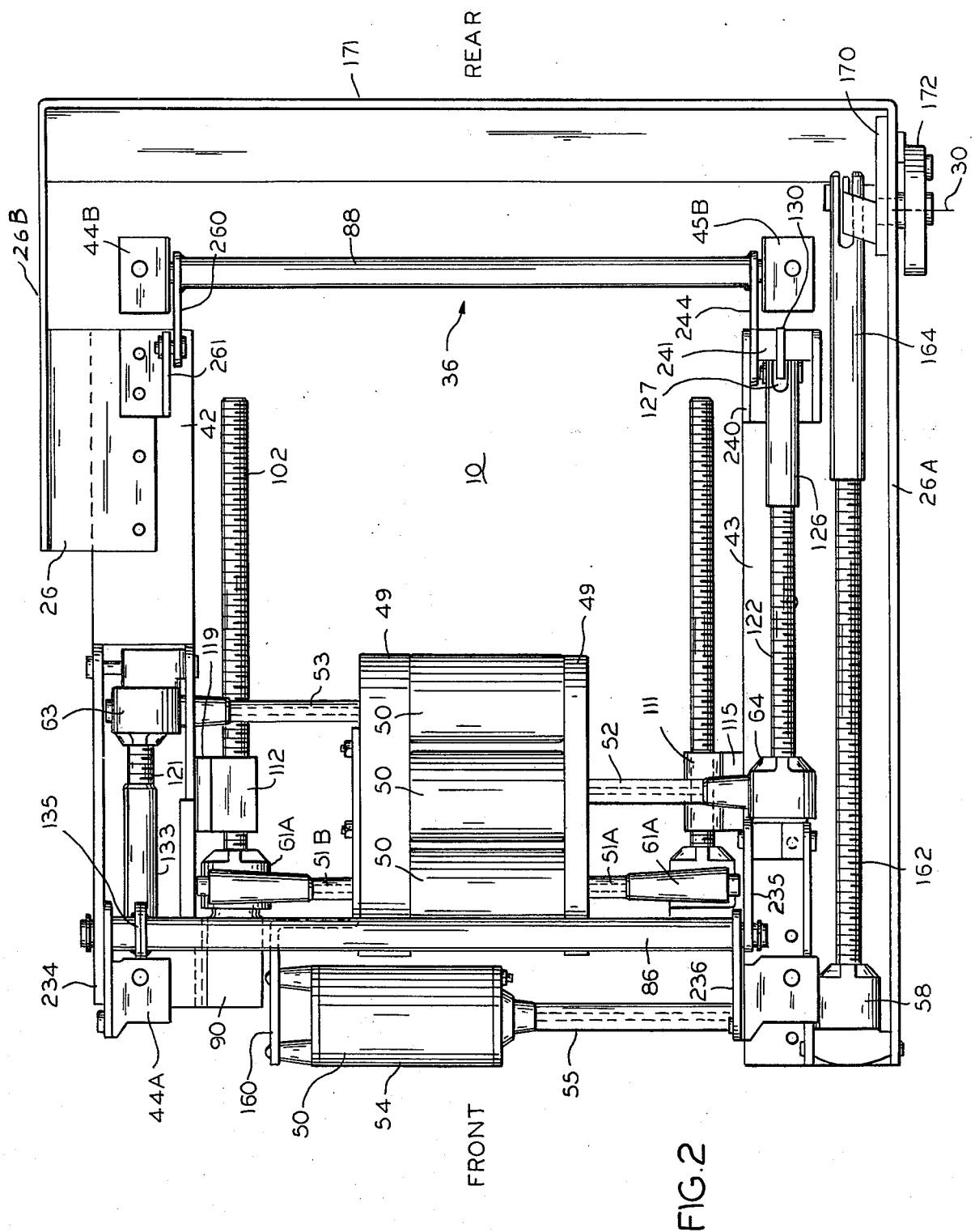
FIG. 2 is a view of the mechanism viewed from the top thereof.
Figure 3:
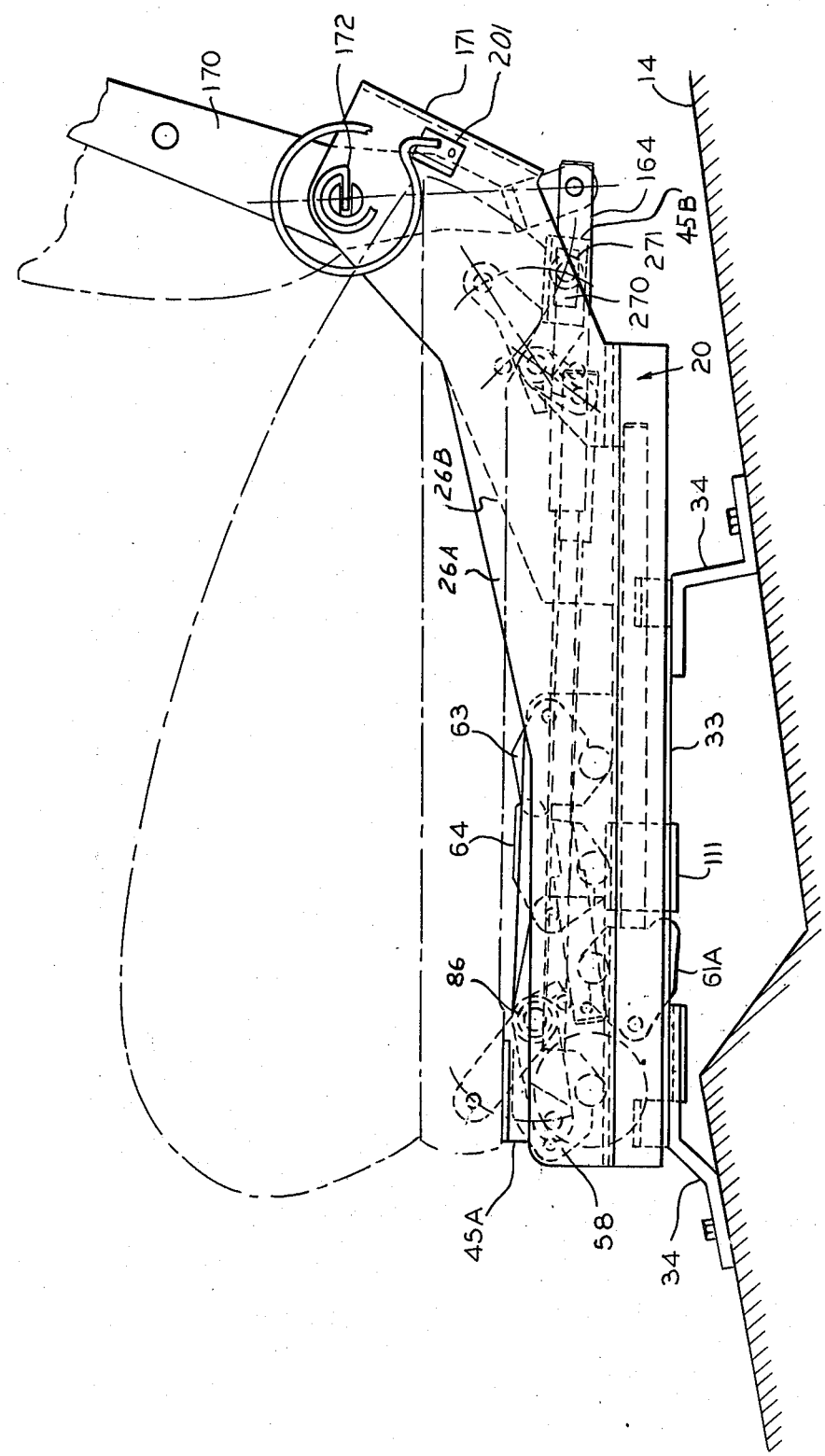
FIG. 3 is a side elevational view of the apparatus of FIG. 2.
Figure 4:
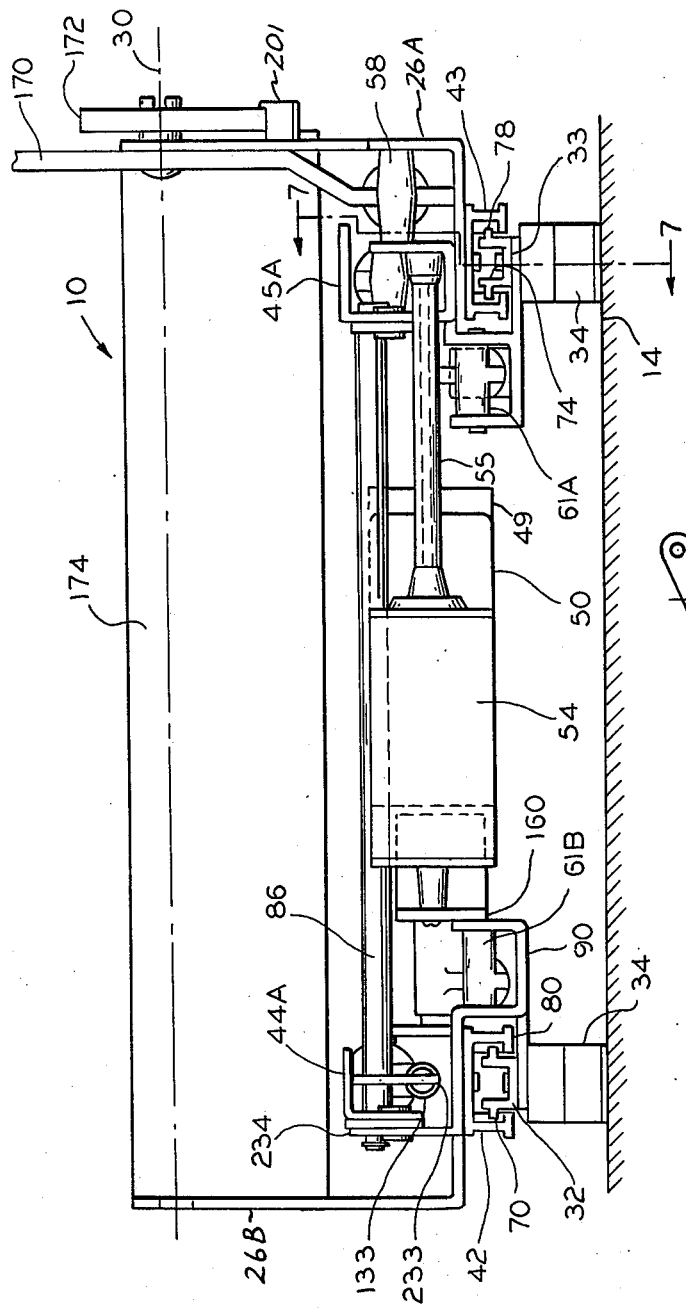
FIG. 4 is an end view of the apparatus of FIG. 2 viewed from the front thereof in the full down position.

FIGS. 2-4 show in greater detail the mechanism 10 employing a preferred embodiment of my invention. The mechanism 10 has two transversely-spaced generally U-shaped structural mounting base rails 32 and 33, (FIG. 4) each of which is suitably affixed by bolts or the like to front and rear respective beams or brackets 34, the beams being secured permanently to the floor 14 of the vehicle. The two base rails 32 and 33 are parallel to one another and are spaced a lateral distance from one another to receive and form the stationary support for a vehicle seat on the two rails.

The major structural elements of the mechanism 10 are the respective stationary mounting base rails 32 and 33, and a carriage 36 longitudinally translatable along the rails. The carriage is generally comprised of two spaced apart upper seat tracks 42 and 43, each upper track being engaged with a like base rail 32 and 33 in a tracked relationship allowing horizontal front to rear movement of the upper tracks. Seat securing brackets 44A and B and 45A and B rest above the tracks of the mechanism and are coupled to the ends of the seat pan or frame 16. The front brackets 44A and 45A are pivoted jointly to raise the front end of the seat frame, the rear brackets 44B and 45B are pivoted jointly to raise the rear seat end. The brackets 44 and 45 support the seat pan 16 to raise or lower the seat ends accordingly. Controlled drive, translatory motion of the carriage 36 in response to selection at control devices (not shown) produces longitudinal movement of the seat track in a fore and aft sense. Other controls (not shown) produce selective vertical movement of either the front or the rear end of the seat securing brackets 44 and 45 and consequent movement of the front and/or rear end of the seat, respectively.

In FIGS. 2-4, I show a drive for the mechanism using four, single-armature motors 50 of a type well-known in the art. Some of the motors (three, as shown) may have a common rigid housing or casing 49 with suitable end bell structure enclosing respective output drive shafts 51, 52 and 53, for the fore and aft drive, front vertical drive and rear vertical drive respectively. Shaft 51 has a portion 51A extending from one end of its motor and a portion 51B extending from the other end thereof. A separate motor 54 is used to drive the output shaft 55 for the seat back movement. The four motors i.e., motor 54 and the three motors in common housing 49, are supported intermediately in the mechanism 10 between the mounting base rails and are supported on the upper tracks for movement therewith through suitable mounting platform 90 carrying brackets 160. Suitable other motor-controlled drives such as a single motor with four individually selectable clutch drive shafts or four separate motors mounted (in parallel with one another) could also be used. In any event, there would be an output shaft from each motor-controlled drive. The four output shafts 51, 52, 53 and 55 of the motor drives are connected to respective driven assemblies in a known manner.

The motor drive output armature or shafts 51, 52, 53, and 55 each are engaged to and rotate an internal drive within an enclosing flexible tube, the cable and tube being of known design (the cable within a tube herein being generally called a shaft). The internal cable for each shaft may in any conventional manner rotate a suitable driven gear (not shown) within the enclosing socket e.g., 58, of a respctive gear box. Each gear box may be of the type shown in U.S. Pat. No. 3,951,004 to M. Heesch, which issued Apr. 20, 1976. Five such gear boxes or transmissions are provided, all mounted on the upper track or carriage. Two boxes 61A and 61B are provided, one on each lateral side of the mechanism shown in FIG. 2 are driven by the horizontal shaft portion 51A and 51B at each lateral end of the motor. The gear boxes of the drive assemblies of FIG. 2 (viewed from the front) are called the left track horizontal gear box 61B, right track horizontal gear box 61A, front vertical gear box 63, rear vertical gear box 64 and seat back gear box 58 herein are essentially identical in internal construction and operation. The engagement of each shaft cable with the driven shaft within the socket of the gear box controls the rotation of gearing (not shown) within the gear box to produce output rotation of a lead screw responsive to rotation of the respective motor driven shaft.

As seen best in FIG. 4, each stationary mounting base rail 32 and 33 of the apparatus is a unitary, rigid structural member having a generally U-shaped cross section with stepped, outwardly directed flanges 70. The web 72 of the base rail is supported on the mounting brackets 34 at both the front and the rear. Suitable apertures or mounting holes (not shown) in the brackets 34 allow the base rails 32 to be mounted to suitable floor support structure of the vehicle.

The sides 74 of the U-shape of the mounting base rail (shown best in FIG. 4) are parallel and terminate in outwardly facing horizontal flange members 70. Suitable plastic guides 78 are provided with longitudinal slots for slidably receiving these flange members to provide a sliding relationship between the flange members 70 of the rails 32 and 33, and the inwardly extending channel slide track members 80 of upper seat tracks 20 within which these guides are tracked. The track members 80 essentially comprise a unitary beam in an inverted U-shaped form, with inwardly disposed channel flanges supporting the plastic slide guides.

As seen best in the plan view of FIG. 2, the carriage 36 includes the motor drive structure mounted on the two transversely spaced-apart slide tracks 42, 43 and movable jointly relative to the stationary rails 32 and 33 in a fore and aft or front to rear sense. The carriage structure further includes a transverse platform structure 90 including a bracket 160 affixing the motors midway between the tracks 42 and 43. A front torsion bar 86 and a rear torsion bar 88 are each laterally disposed at respective ends of the tracks 42 and 43. The torsion bars are each mounted to the tracks 42 and 43 to span the space between the tracks at the respective front and rear of the carriage and brace the structure. Pivotally linked to the torsion bars are seat securing brackets 44A and B and 45A and B which are positioned above the respective tracks.

The sliding upper tracks 42, 43 also act as the mounting support for platforms for the gear boxes 61A, 61B controlling horizontal drive. The upper seat tracks 42 and 43 support gear box 58 for the seat back and rear and front vertical seat drives 63 and 64. As seen best in FIG. 2, the fore and aft drive shafts 51 are generally coaxial each coupled to respective gear boxes 61A and 61B to rotate the respective output screws 101 and 102 for the fore and aft drive. These screws 101 and 102 are cantilevered rearwardly from their driven coupling in the respective gear boxes 61A and 61B.

Each of the horizontal drive screws 101 and 102 are threaded within respective drive blocks or nuts 111 and 112, the drive blocks being secured to the lower stationary rails 32, 33. Thus, the blocks 111, 112 are stationary and the lead screws are advanced or retracted on operation of the fore and aft motor and shafts 51 and 52. Each drive block 111 and 112 has a fore and aft threaded tube with a horizontally extending integral cover bracket 114 and 115 respectively. The cover bracket is secured to the lower stationary rails so that on rotation of the fore and aft motor, both shafts are rotated to advance or retract relative to the drive blocks 111 and 112 and move the upper tracks and carriage 36 accordingly. The upper tracks slide relatively to the lower stationary rails through the medium of the plastic guides, as mentioned previously.

The vertical drive is implemented through shaft 53 for the front end of the seat and shaft 52 for the rear end of the seat. Each shaft 53, 52 has a gear box or gear housing 63, 64 coupled to it for causing rotation of respective lead screws 121 and 122.

The front drive gear box 63 has extending in a forward direction therefrom the drive screw 121. Drive screw 121 is rotated responsive to rotation of motion shaft 53 in a known fashion. An internally threaded tube or nut 133 receives the free end of drive screw 121. As shown best in FIG. 4, the front end of tube 133 has a central axial slot 233. Slot 233 provides a clearance opening within which there is disposed a link 135. The lower end of link 135 includes an aperture through which a pivot pin is inserted such that the lower end of link 135 is pivotally connected to tube 133 in slot 233. Link 135 includes a second aperture in its middle through which torsion bar 86 extends. Link 135 is firmly affixed to torsion bar 86 by welding or the like. Torsion bar 86 is pivotally connected at one end to bracket 234 which in turn is fixedly mounted to upper seat track 42. Torsion bar 86 is pivotally connected at its other end to bracket 235 which in turn is fixedly mounted to upper seat track 43. As shown in FIGS. 2, 4, 9 and 10, a lever 136 is attached to one end of the torsion bar 86 adjacent the link 135. The upper end of lever 136 is pivotally connected to bracket 44A. A slave link 236 is firmly affixed to the other end of torsion bar 86 and pivotally connected to bracket 45A.

The rear drive gear box 64 has extending rearwardly therefrom, a drive screw 122. This drive screw 122 is rotated responsive to rotation of motor shaft 52 in known fashion. An internally threaded tube 126 or nut member receives the free end of lead screw 122, and is advanced or retracted in response to rotation of the lead or drive screw 122. At its rearward end, tube 126 has a central axial slot 127. This slot 127 provides a clearance opening within which there is pivotally fitted a link 130, the link being pinned pivotally diametrally to the tube 126 at a pin. The link 130 is mounted pivotally so that the lower end of the link is advanced or retracted responsive to rotation of the lead screw. At its other end, the link 130 is firmly affixed as by welding or the like, to the outside of a sleeve 241. Sleeve 241 is pivotally connected to bracket 240 which is mounted to upper track 43, a link 244 is firmly affixed to sleeve 241 and to torsion bar 88. Thus on rotation of the lead screw 122, link 130 is rotated to rotate link 244 which in turn rotates torsion bar 88. The operation of torsion bars is described in U.S. Pat. No. 4,015,812 issued Apr. 5, 1977. The other end of torsion bar 88 is firmly affixed as by welding to one end of slave link 260. The other end of link 260 is pivotally connected to bracket 261 which in turn is affixed to track 42.

Rear seat pan brackets 44B and 45B are pivotally connected to torsion bar 88. A lost motion connection 190 is provided between each bracket 44B, 45B and the torsion bar 88. This connection, best shown in FIG. 3, on bracket 45B is provided by a horizontal slot 270 in bracket 45B in which the rear torsion bar 88 is pivotaly pinned by a C ring 271. This lost motion connection 190 is provided only at the rear of the seat and not at the front. By this arrangement, rotary motion of the link arms 244 and 260 is translated into essentially vertical motion of the rear portion of the seat pan 16 and seat cushion 17. By providing a lost motion connection at the rear of the seat pan 16 and by providing a pivot connection at the front of the seat pan 16, an advantageous effect is obtained. More specifically, as the seat front is raised, it is raised not entirely vertical, but through an arc toward the seat back. Thus, as the front of the seat is raised, the entire seat pan 16 and cushion 77 are moved rearward. With this movement the lumbar region of the back of the seated person is pressed into the back seat cushion 24. This pressure has been observed to greatly enhance the seating comfort.

Movement of the seat back is controlled by motor 54. Motor 54 is affixed to motor structure 49 by bracket 160 for movement with the carriage in a fore and aft sense. Motor 54 on operation rotates shaft 55 to gear box 58. Gear box 58 is mounted on the upper seat track externally and independently of any connection to the elevating brackets 45A and 45B. Rotation of shaft 55 causes rotation of lead screw 162. The lead screw 162 is threaded and mates with an internally threaded tubular sleeve 164. The sleeve 164 has a bifurcation 166 in its end remote from motor 54 and is pivotally pinned at 168 to the lower end of a pivot arm 170. The upper end of arm 170 is secured to the seat above the pivot axis 30 of the seat, the seat back being pivotally secured to the back support structure 181 at pivot axis 30. Mounted on the pivot axis 30 is a coiled torsion spring 172 which functions as an assist spring, the spring outer end being affixed to the side bracket 26A as by clip 201.

The seat back support 171 comprises a lateral bracing bar 174 extending across the entire seat back and integrally formed downwardly angled brackets 26A, 26B. The brackets 26A and 26B are secured on the upper seat tracks 43 and 42, respectively as seen best in FIG. 4.

Figure 5:
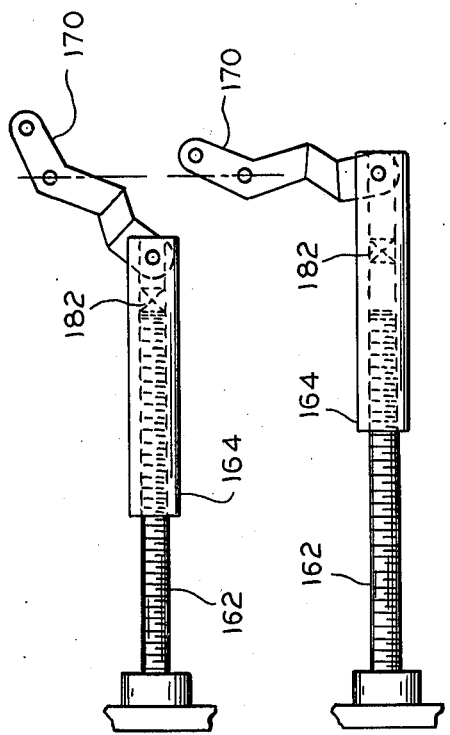
FIG. 5 is a section partial view in elevation of the rear portion of the seat back drive as viewed in FIG. 2 at one extreme condition.
Figure 6:
FIG. 6 is a view similar to FIG. 5 showing the seat back drive at the condition opposite that of FIG. 5.
Figure 9:
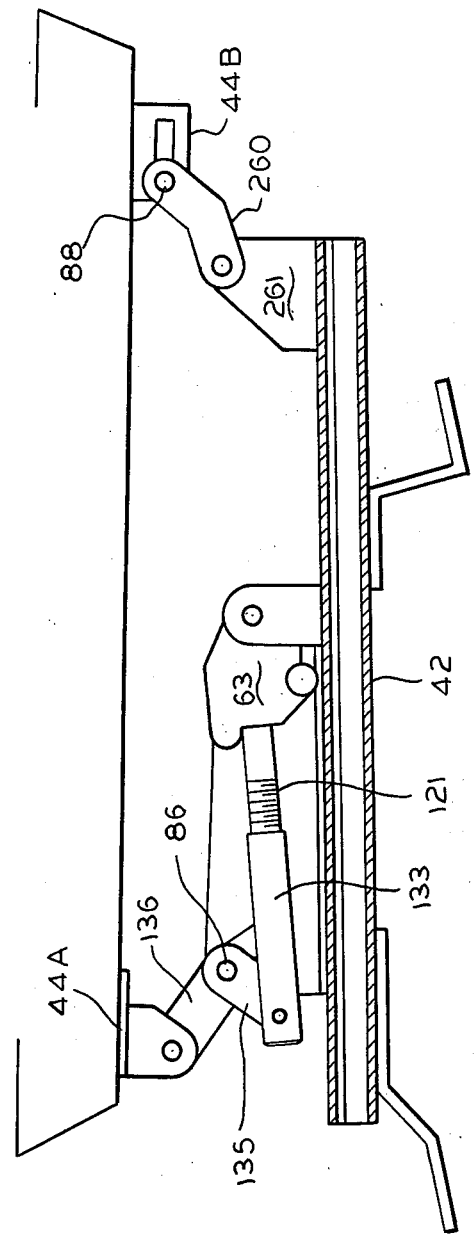
FIGS. 9 and 10 are sectional views taken along line 9—9 of FIG. 4 with FIG. 9 showing the full up position and FIG. 10 showing the full down position.
Figure 10:
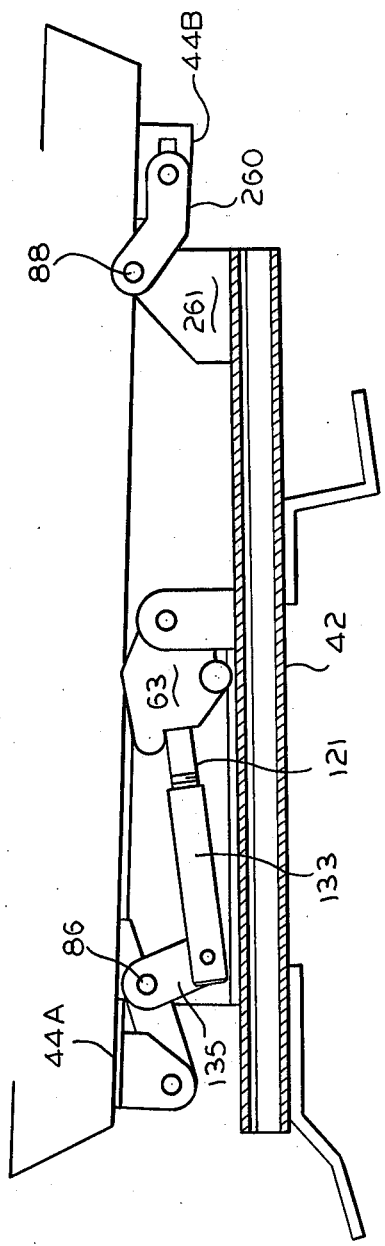

In FIGS. 5 and 6, I show one method of limiting the movement of the pivot arm 170 relative to the threaded receiver tube 164 of the seat back postioning mechanism. In FIG. 5, the full down position, the threaded drive screw has entered the mating threaded tube to its maximum amount. Abutting against the lower end 180 of the pivot arm 170 is a floating slug 182 whose other end is engaged by the end of the threaded drive screw. Thus, the limit of movement of the drive screw and pivot arms are established.

In FIG. 6, a partially up position of the seat back is shown, in which the slug is floating within the threaded tube. The distance between the end of the screw and drive link in the full down position can be calculated. A hardened steel slug 182 cut to the required length is inserted in the drive nut or threaded tube 164, as shown. The slug is held captive in the drive nut by the screw 162 at one end and the drive link 170 on the other end. To vary the "down stop" position, the slug length may be changed. The slug will not cause the screw to jam as the thread angle should be great enough to back off quickly. This method of stopping under a lumped seat cushion or back rest prevents the distortion and/or deflection of links, pivots, etc.

As viewed in FIG. 3, the mechanism is shown in its rearmost position from which the mechanism is movable as much as seven inches to a forwardmost position (not shown).

Further in FIG. 3, the axis of the front torsion bar 86 is shown in the full down position designated by numeral 86D and in its fully up position designated by numeral 86U. In FIG. 3, it can be seen that the axis of 86D is forward of the axis of 86U by a distance of about two inches. This offset distance is an indication that as the front end is raised the entire seat frame is moved rearwardly a distance of about one half inch. The lost motion connection 190 between the seat frame and the torsion bar control bracket allows this movement. The rearward movement exerts pressure on the lumbar area of the back of a person sitting in the seat. Relief of this pressure may be obtained by moving the seat back accordingly.

What is claimed is:

1. A power seat track mechanism for horizontally moving the seat of a motor vehicle in a forward and rearward sense and for elevating the front end of the seat and elevating the rear end of the seat, the mechanism including laterally spaced apart first and second rail members stationarily secured to the vehicle, a movable carriage comprised of a track member engaged with each rail member for constraining the carriage to forward and rearward horizontal movement, motor drive means for elevating said seat, front elevating structure operated by said motor drive means for elevating the front end of the seat substantially independently of elevation of the rear end of the seat, rear elevating structure operated by said motor drive means for elevating the rear end of the seat substantially independently of any operation of the front elevating structure, a seat back mounted on said carriage for horizontal movement therewith, the mounting of said seat back being independent of both seat elevating structures, a pivotal link at the front end of the seat interfacing between the front elevating structure and the seat, said link having a pivotal mounting to said carriage and to a section affixed to said seat, said link movable about its carriage mounting on operation of the front drive structure to move the front end of the seat upwardly and a limited amount rearwardly during elevation of the front end of the seat, and a second link at the rear end of the seat with one section of the second link affixed to the carriage and a second section spaced from said one section coupled to the rear end of the seat through a lost motion connection to enable said limited rearward movement of the seat on elevation of the front end of the seat, and further comprising a torsion bar at each seat end, each said torsion bar affixed to a link at the respective seat end thereof, and in which there is a bracket supporting the seat adjacent the rear thereof, said bracket including an elongated horizontal slot supporting the torsion bar at the seat rear for effecting said lost motion connection.

2. A power seat track mechanism as claimed in claim 1, in which there is a bracket supporting the front end of said seat, said front end bracket being connected to said front end torsion bar.

3. A power seat track mechanism as claimed in claim 2, in which there is drive structure for said seat back for pivoting said seat back independently of the elevational movement of the seat.

4. A selective adjustment mechanism for a vehicle seat elevatable at its front end and at its rear end, track members at the lateral sides of the seat extending from adjacent the front to adjacent the rear thereof, motor drive means, first apparatus driven by said drive means for selectively elevating the front end of the seat and second apparatus driven by said drive means for selectively elevating the rear end of the seat, a seat back mounted on said track members independently of the seat whereby said seat back is not moved on elevation or lowering of the seat, said apparatus comprising a first lead screw mechanism for elevating the front end of the seat and a second lead screw mechanism for elevating the rear end of the seat, a first laterally extending torsion bar adjacent the front end of the seat and a second torsion bar adjacent the rear end of the seat, a first link coupled to said first lead screw mechanism for pivotal movement to rotate said first torsion bar in response to a selected operation of said drive means, a second link coupled at one section to said second lead screw mechanism for pivotal movement to elevate said second torsion bar in response to selected operation of said drive means, said first link secured to said first torsion bar in a mutually pivotal mounting to pivot said seat upwardly and rearwardly on operation of said first lead screw, and said second link joined to said second torsion bar and to the rear of said seat in a generally horizontal lost motion connection allowing rearward movement of the rear end of the seat on elevational movement of the front end of the seat without moving said seat back.

5. A selective adjustment mechanism as claimed in claim 4, in which there is a first seat support bracket means connected to a lever, said lever being fixedly attached to said first torsion bar with said bracket means affixed to said seat for supporting the front end thereof, and in which there is a second support bracket means bearing said second torsion bar in a lost motion slot in said second bracket with said second bracket affixed to said seat a fixed spacing from said first bracket.

6. A selective adjustment mechanism as claimed in claim 5, in which said first bracket means includes a bracket at each lateral side of the seat and said second bracket means includes a bracket at each lateral end of said seat.

7. A selective adjustment mechanism as claimed in claim 6, in which there is a further link at the lateral end of said seat both at the front and at the rear thereof with one of said links at each end being driven by the lead screw and the other link at each end being a slave.

* * * * *